US008730198B2

(12) United States Patent
Park et al.

(10) Patent No.: US 8,730,198 B2
(45) Date of Patent: May 20, 2014

(54) DISPLAY DEVICE AND DRIVING METHOD THEREOF

(75) Inventors: Jong-Woung Park, Seongnam-si (KR); Young-Ok Cha, Gwangmyeong-si (KR); Kee-Han Uh, Yongin-si (KR); Joo-Hyung Lee, Gwacheon-si (KR)

(73) Assignee: Samsung Display Co., Ltd. (KR)

( * ) Notice: Subject to any disclaimer, the term of this patent is extended or adjusted under 35 U.S.C. 154(b) by 936 days.

(21) Appl. No.: 11/931,245

(22) Filed: Oct. 31, 2007

(65) Prior Publication Data
US 2008/0192018 A1  Aug. 14, 2008

(30) Foreign Application Priority Data
Feb. 13, 2007 (KR) ........................ 10-2007-0014721

(51) Int. Cl.
G06F 3/044 (2006.01)
(52) U.S. Cl.
USPC ......... 345/174; 345/173; 345/178; 178/18.01
(58) Field of Classification Search
USPC ..................... 345/173; 178/18.01; 200/512
See application file for complete search history.

(56) References Cited

U.S. PATENT DOCUMENTS

| | | | | |
|---|---|---|---|---|
| 2004/0056845 | A1* | 3/2004 | Harkcom et al. | 345/173 |
| 2004/0061687 | A1* | 4/2004 | Kent et al. | 345/173 |
| 2006/0146038 | A1* | 7/2006 | Park et al. | 345/173 |
| 2006/0201931 | A1 | 9/2006 | Lee et al. | |
| 2007/0109274 | A1* | 5/2007 | Reynolds | 345/173 |

FOREIGN PATENT DOCUMENTS

| | | |
|---|---|---|
| CN | 1527274 | 9/2004 |
| CN | 1908744 | 2/2007 |
| JP | 62-214426 | 9/1987 |
| JP | 05-006153 | 1/1993 |
| JP | 08-179887 | 7/1996 |
| JP | 08-234910 | 9/1996 |
| JP | 09282096 A | 10/1997 |
| JP | 2002215317 A | 8/2002 |
| JP | 2002297302 A | 10/2002 |
| JP | 2003233464 B2 | 8/2003 |
| JP | 2004005415 A | 1/2004 |
| JP | 2005129083 A | 5/2005 |
| JP | 2005-222266 | 8/2005 |
| JP | 2005-267478 | 9/2005 |
| JP | 2006-040289 | 2/2006 |
| JP | 2006107106 A | 4/2006 |
| JP | 2006-190268 | 7/2006 |
| JP | 2006268288 A | 10/2006 |

(Continued)

*Primary Examiner* — Grant Sitta
(74) *Attorney, Agent, or Firm* — Cantor Colburn LLP

(57) ABSTRACT

A display device includes a display panel having a plurality of pixels, a plurality of sensing units formed in row and column directions in the display panel, each of the sensing units generating a first sense data signal based on a contact on the display panel, a sense signal processor generating second sense data signals based on the first sense data signals, and a contact determiner generating first deviation data based on the second sense data signal of a predetermined frame and the second sense data of a sample frame group, in the second sense data signals with respect to a predetermined sensing unit of the second sense data signals in a plurality of frames, generating second deviation data based on the first deviation data of a predetermined sensing unit and the first deviation data of a sample sensing unit, in the first deviation data of a predetermined frame, and determining whether a contact occurs and a contact position based on the second deviation data.

16 Claims, 14 Drawing Sheets

(56) References Cited

FOREIGN PATENT DOCUMENTS

| | | | |
|---|---|---|---|
| KR | 1020000052152 A | 8/2000 | |
| KR | 1020040103125 A | 12/2004 | |
| KR | 1020050070212 A | 7/2005 | |
| KR | 1020050070214 A | 7/2005 | |
| KR | 1020060054978 A | 5/2006 | |
| KR | 1020060079531 A | 7/2006 | |
| KR | 1020060102461 A | 9/2006 | |

* cited by examiner

US 8,730,198 B2

DISPLAY DEVICE AND DRIVING METHOD THEREOF

This application claims priority to Korean Patent Application No. 10-2007-0014721, filed on Feb. 13, 2007, and all the benefits accruing therefrom under 35 U.S.C. §119, the contents of which in its entirety are herein incorporated by reference.

BACKGROUND OF THE INVENTION (a) Field of the Invention

The present invention relates to a display device and a driving method thereof, and more particularly, to a display device having a contact determiner.

(b) Description of the Related Art

Due to recent demands for reduction in the weight and thickness of personal computers and televisions, for example, a reduction in the weight and thickness of a display device is required. Thus, cathode ray tubes ("CRTs") are now being replaced with flat panel display devices.

Examples of flat panel display devices include a liquid crystal display ("LCD"), a field emission display ("FED") device, an organic light emitting device ("OLED"), and a plasma display panel ("PDP") device.

Each of the active flat panel displays includes a plurality of pixels arranged in a matrix, and controls strength of light based on luminance information of each pixel to display images. LCDs among the active flat panel displays typically include a pair of panels that are provided with pixel electrodes and a common electrode, as well as a liquid crystal layer with dielectric anisotropy interposed between the two panels.

An LCD generates electric fields by applying voltages to pixel electrodes and a common electrode, and the strengths of the electric fields applied thereto are varied to adjust the transmittance of light passing through the liquid crystal layer, thereby displaying images.

A touch screen panel is an apparatus that writes or draws a character or a picture through contact with a finger, a pen, etc., on a screen. Touch screen panels may be used for a machine such as a computer to perform a desired command by executing a program when an icon is pressed. An LCD to which a touch screen panel is attached may have two primary functions: determining whether a contact occurs, and determining contact position information. However, the addition of a touch screen feature to the LCD comes with the addition of problems such as an increase in the cost of a display, yield decrease due to the addition of a manufacturing process for bonding a touch screen panel on a liquid crystal panel, luminance deterioration of the liquid crystal panel due to the passage of light through an additional layer, an increase in product thickness, and other related problems.

Therefore, technology for providing sensing units within pixels that display an image in an LCD instead of an additional touch screen panel has been developed. The sensing unit senses a variation of light or pressure applied to a screen of the LCD by a touch of a finger, etc. of a user, to determine whether there has been contact with the screen and a contact position.

The sensing units are connected to a plurality of bias voltages. Thus, when a contact occurs, the sensing unit corresponding to the contact position generates a sense data signal based on the bias voltage and outputs the sense data signal.

Since the sensing units are in response to a bias voltage variation, sense data signals from the sensing units are varied in accordance with the bias voltage variation. When impulse noises occur in the bias voltages, sense data signals are incorrectly generated due to the impulse noise.

BRIEF SUMMARY OF THE INVENTION

According to an exemplary embodiment of the present invention, a display device includes a display panel having a plurality of pixels, a plurality of sensing units formed in row and column directions in the display panel, each of the sensing units generating a first sense data signal based on a contact on the display panel, a sense signal processor generating second sense data signals based on the first sense data signals, and a contact determiner generating first deviation data based on the second sense data signal of a predetermined frame and the second sense data signals of a sample frame group, in the second sense data signals with respect to a predetermined sensing unit of the second sense data signals in a plurality of frames, generating second deviation data based on the first deviation data of a predetermined sensing unit and the first deviation data of a sample sensing unit, in the first deviation data of a predetermined frame, and determining whether a contact occurs and a contact position based on the second deviation data.

The first deviation data may include the maximum of differences between the second sense data signal of the predetermined frame and the second sense data signals of the sample frame group. The sample frame group may include at least two frames next to the predetermined frame.

The second deviation data may include a difference between the first deviation data of the predetermined sensing unit and the first deviation data of the sample sensing unit with respect to each frame. The sample sensing unit may be spaced apart from the predetermined sensing unit.

The contact determiner may filter the second sense data signals from the sense signal processor. The filtering of the second sense data signals may be performed as:

$$Si = (1/Nn) \sum_{k=i}^{i+Nn-1} Rk$$

wherein S represents a second sense data signal after filtering, R represents a second sense data signal before filtering, i represents a number of a corresponding frame, and Nn represents a number of frames of the sample frame group.

The contact determiner may compare a maximum of the second deviation data of a frame and a reference value to determine whether the contact occurs and the contact position.

The sample sensing unit with respect to one sensing unit in the row direction may be a remaining row sensing unit, and the sample sensing unit with respect to one sensing unit in the column direction may be a remaining column sensing unit.

The contact determiner may include a filtering unit filtering the second sense data signals from the sense signal processor to remove noise, a first data generator generating the first deviation data based on filtered second sense data signals, a second data generator generating the second deviation data based on the first deviation data, a position determining unit determining whether the contact occurs and the contact position based on the second deviation data, and a register modifying a value of a contact flag and contact information based on determination result of the position determining unit. The position determining unit may generate a maximum of the second deviation data, and may compare the maximum with a threshold value to determine whether a contact occurs and a contact position.

At least one of the plurality of sensing units may include a variable capacitor having liquid crystal as a dielectric material and varying capacitance based on pressure, and a reference capacitor connected to the variable capacitor.

The first deviation data and the second deviation data may include spatial and temporal deviation information. Even when impulse noises occur in the display device, determining whether a contact occurs and determining a contact position may be made possible by using the second deviation data.

According to an exemplary embodiment of the present invention, a driving method of a display device having a plurality of pixels and a plurality of sensing units sensing a contact includes generating sense data signals based on reading signals from the sensing units, generating first deviation data based on the sense data signal of a predetermined frame and the sense data signals of a sample frame group, in the sense data signals with respect to a predetermined sensing unit of the sense data signals in a plurality of frames, generating second deviation data based on the first deviation data of a predetermined sensing unit and the first deviation data of a sample sensing unit, in the first deviation data of a predetermined frame, and determining whether a contact occurs and a contact position based on the second deviation data.

Generating the first deviation data may generate the maximum of differences between the sense data signal of the predetermined frame and the sense data signals of the sample frame group as the first deviation data.

Generating the second deviation data may generate a difference between the first deviation data of the predetermined sensing unit and the first deviation data of the sample sensing unit as the second deviation data.

The driving method may further include filtering a noise after generating the sense data signals.

Determining whether the contact occurs and the contact position may include comparing a maximum of the second deviation data of a frame and a reference value to determine contact occurrence and the contact position.

The sense data signal may be generated based on a capacitance variation due to a contact.

BRIEF DESCRIPTION OF THE DRAWINGS

Exemplary embodiments of the present invention can be understood in more detail from the following descriptions taken in conjunction with the accompanying drawings, in which:

FIGS. 7A and 7B show first deviation data classified according a predetermined frame, respectively, wherein FIG. 7A shows that impulse noises do not occur in first deviation data, and FIG. 7B shows that impulse noises occur in first deviation data;

DETAILED DESCRIPTION OF THE INVENTION

Figure 1:
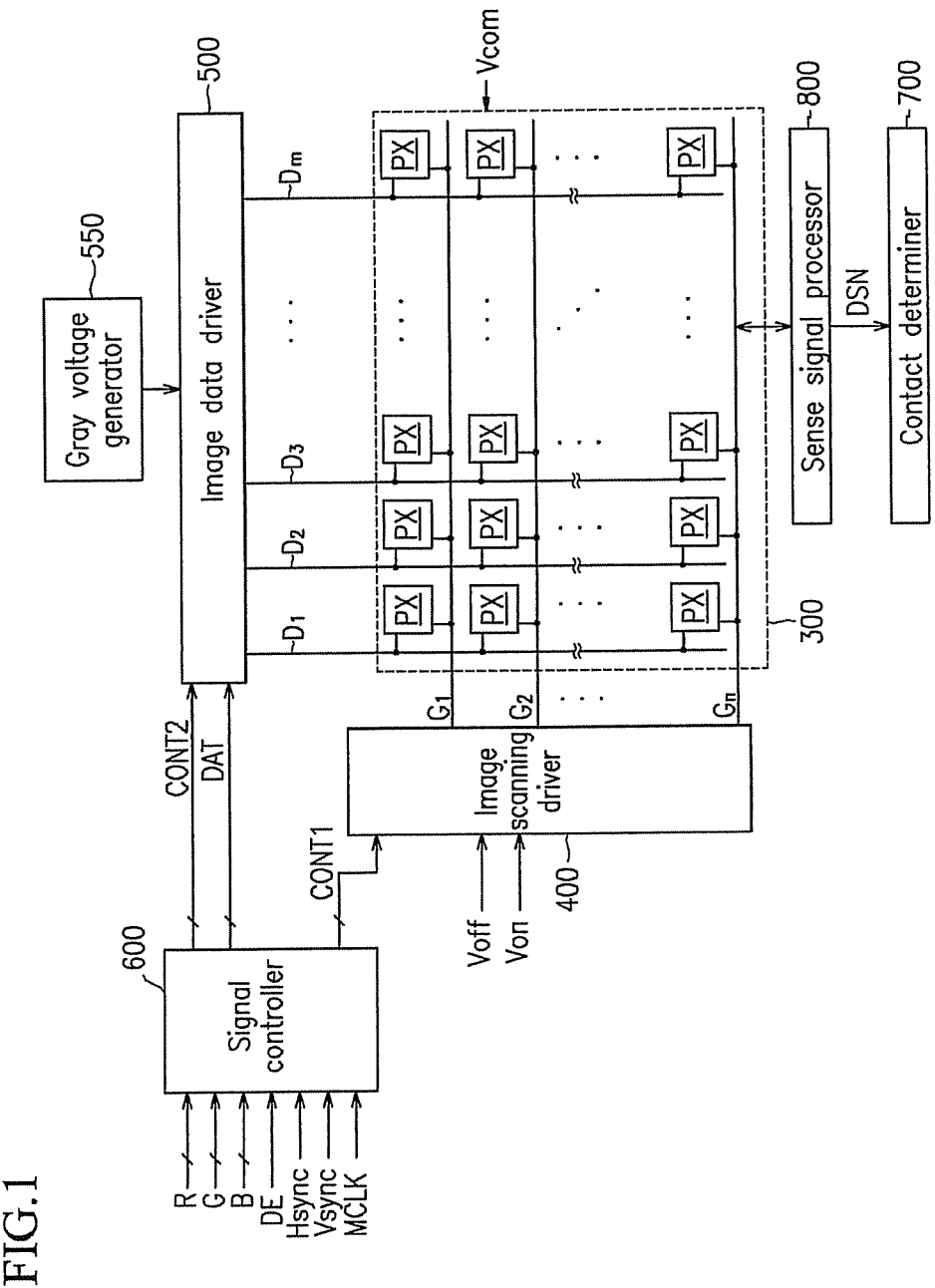
FIG. 1 is a block diagram of an exemplary LCD showing pixels according to an exemplary embodiment of the present invention.

The present invention will be described more fully hereinafter with reference to the accompanying drawings, in which exemplary embodiments of the present invention are shown. This invention may, however, be embodied in many different forms and should not be construed as limited to the exemplary embodiments set forth herein. In the drawings, the thickness of layers and regions are exaggerated for clarity. Like numerals refer to like elements throughout.

It will be understood that when an element such as a layer, film, region, substrate, or panel is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising" or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may be interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A liquid crystal display ("LCD") according to exemplary embodiments of the present invention will now be described with reference to FIGS. 1 through 4.

Figure 2:
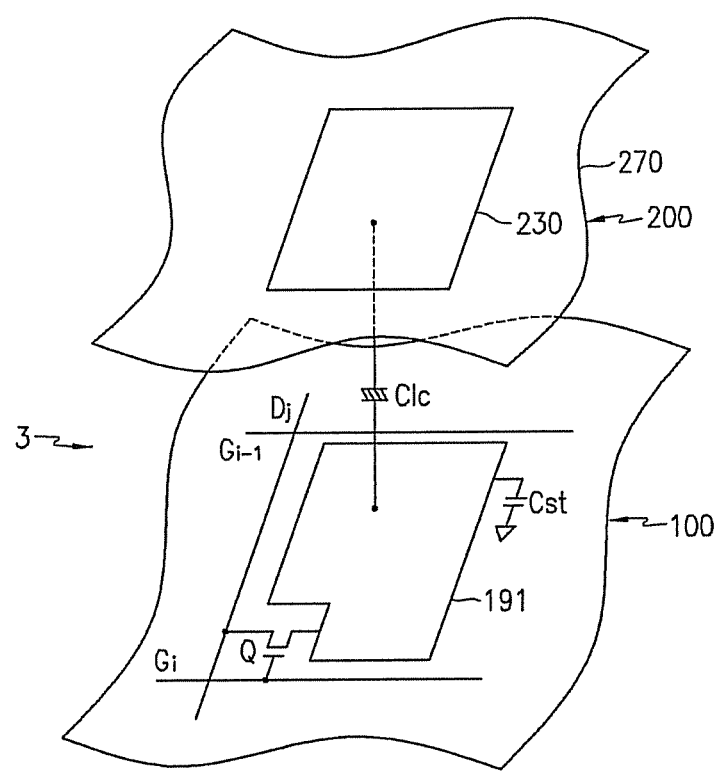
FIG. 2 is an equivalent circuit diagram of an exemplary pixel of an exemplary LCD according to an exemplary embodiment of the present invention.
Figure 3:
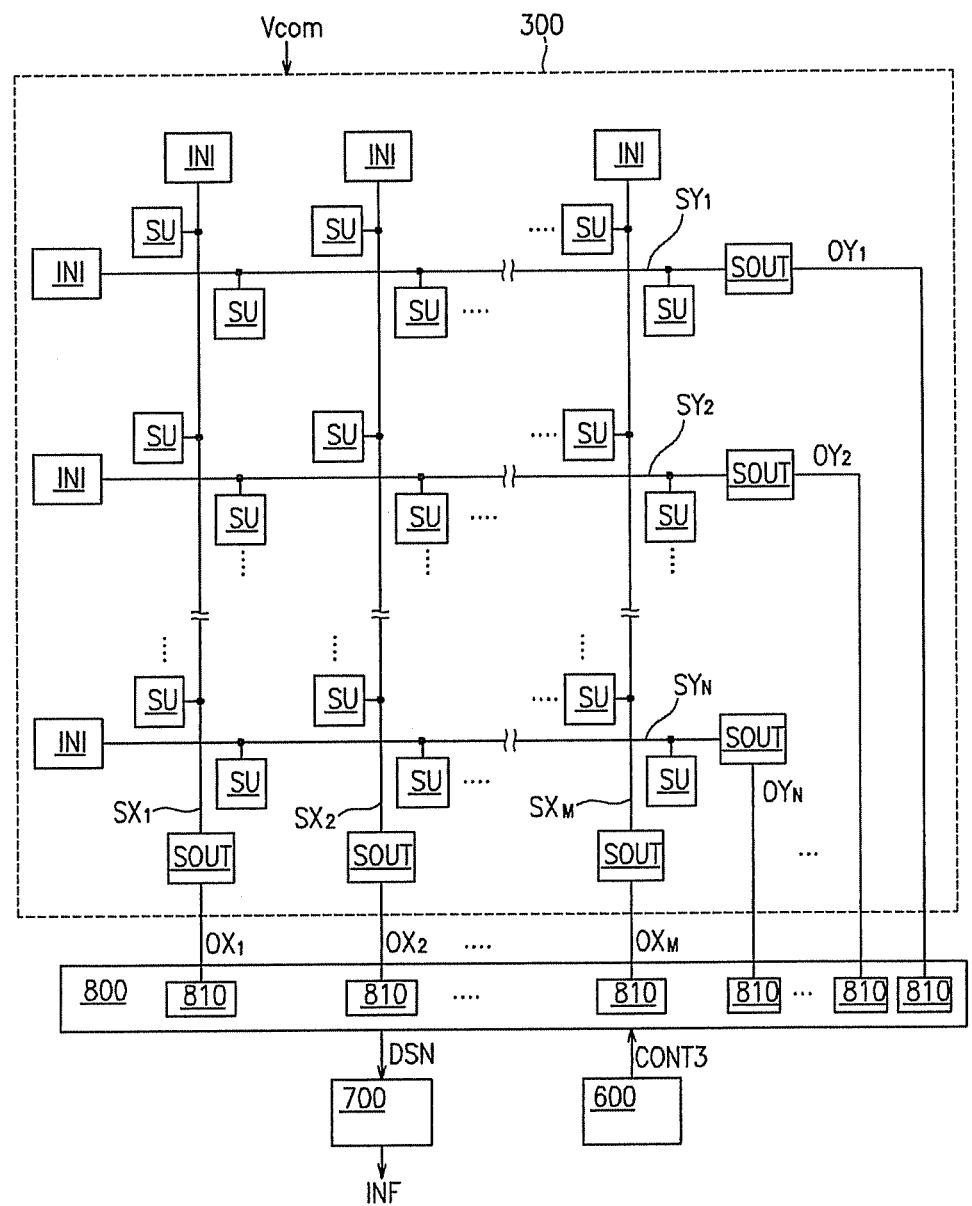
FIG. 3 is a block diagram of an exemplary LCD showing exemplary sensing units according to an exemplary embodiment of the present invention.

FIG. 1 is a block diagram of an exemplary LCD showing pixels according to an exemplary embodiment of the present invention, and FIG. 2 is an equivalent circuit diagram of an exemplary pixel of an exemplary LCD according to an exemplary embodiment of the present invention. FIG. 3 is a block diagram of an exemplary LCD showing exemplary sensing units according to an exemplary embodiment of the present invention, FIG. 4 is an equivalent circuit diagram of an exemplary sensing unit of an exemplary LCD according to an exemplary embodiment of the present invention, and FIG. 5 is an equivalent circuit diagram of a plurality of exemplary sensing units connected to one sense data line in an exemplary LCD according to an exemplary embodiment of the present invention.

As shown in FIGS. 1 and 3, an LCD according to an exemplary embodiment of the present invention includes a liquid crystal ("LC") panel assembly 300, an image scanning driver 400, an image data driver 500, and a sense signal processor 800 that are coupled with the LC panel assembly 300, a gray voltage generator 550 coupled to the image data driver 500, a contact determiner 700 coupled to the sense signal processor 800, and a signal controller 600 for controlling the above elements.

Referring to FIGS. 1 and 3, the LC panel assembly 300 includes a plurality of display signal lines $G_1$-$G_n$ and $D_1$-$D_m$, a plurality of pixels PX that are connected to the display signal lines $G_1$-$G_n$ and $D_1$-$D_m$ and arranged substantially in a matrix, a plurality of sense signal lines $SY_1$-$SY_N$ and $SX_1$-$SX_M$, and RL (reference voltage line RL shown in FIG. 4), a plurality of sensing units SU that are connected to the sense signal lines $SY_1$-$SY_N$ and $SX_1$-$SX_M$, and RL and arranged substantially in a matrix, a plurality of reset signal input units INI each of which is connected to one end of each sense signal line $SY_1$-$SY_N$ and $SX_1$-$SX_M$, a plurality of sense signal output units SOUT each of which is connected to the other end of each sense signal line $SY_1$ to $SY_N$ and $SX_1$ to $SX_M$, and a plurality of output data lines $OY_1$-$OY_N$ and $OX_1$-$OX_M$ each of which is connected to each sense signal output unit SOUT.

Figure 4:
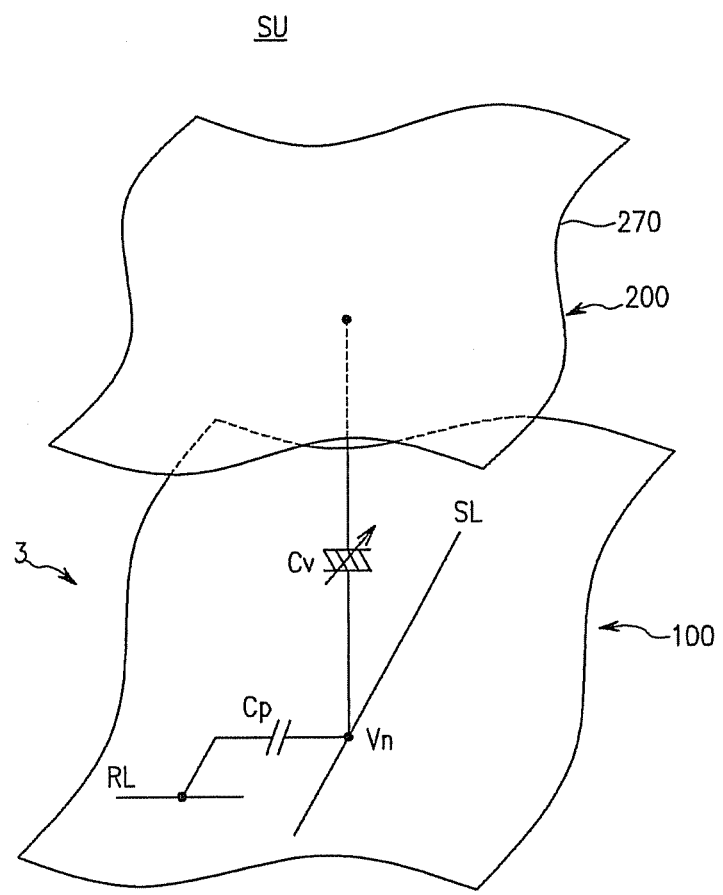
FIG. 4 is an equivalent circuit diagram of an exemplary sensing unit of an LCD according to an exemplary embodiment of the present invention.
Figure 5:
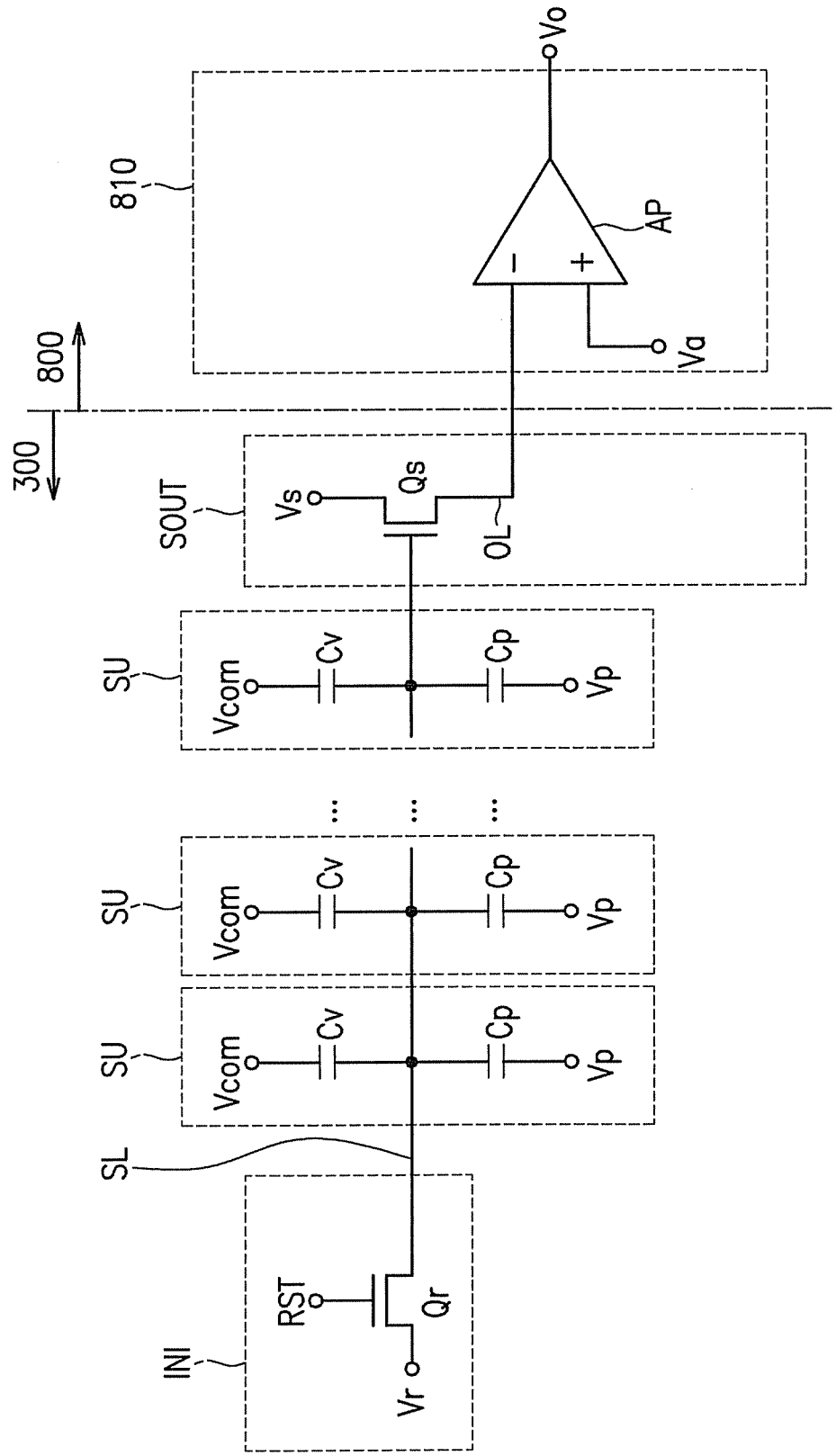
FIG. 5 is an equivalent circuit diagram of a plurality of exemplary sensing units connected to one sense data line in an exemplary LCD according to an exemplary embodiment of the present invention.

Further, referring to FIGS. 2 and 4, the LC panel assembly 300 includes a thin film transistor ("TFT") array (lower) panel 100 and an opposing common electrode (upper) panel 200, an LC layer 3 interposed therebetween, and a spacer (not shown) that maintains a gap between the two panels 100 and 200 and that can be deformed to some extent by compression.

The display signal lines $G_1$-$G_n$ and $D_1$-$D_m$ include a plurality of image scanning lines $G_1$-$G_n$, sometimes referred to as gate lines, that transfer an image scanning signal and image data lines $D_1$-$D_m$ that transfer an image data signal. The sense signal lines $SY_1$-$SY_N$, $SX_1$-$SX_M$, and RL include a plurality of column sense data lines $SX_1$-$SX_M$ and a plurality of row sense data lines $SY_1$-$SY_N$ that transfer a sense data signal, and a plurality of reference voltage lines RL that transmit a reference voltage. The reference voltage has high and low levels and swings between the high and low levels in a predetermined period. In alternative exemplary embodiments, the reference voltage lines RL may be omitted as necessary.

The image scanning lines $G_1$-$G_n$ and the row sense data lines $SY_1$-$SY_N$ extend in approximately a row direction, such as a first direction, and are substantially parallel to each other, and the image data lines $D_1$-$D_m$ and the column sense data lines $SX_1$-$SX_M$ extend in approximately a column direction, such as a second direction, and are substantially parallel to each other. The first direction may be substantially perpendicular to the second direction. The reference voltage lines RL are disposed to extend in the row or column direction.

Referring to FIG. 2, each pixel PX, for example a pixel PX connected to the i-th image scanning line $G_i$ (i=1, 2, ..., n) and the j-th image data line $D_j$ (j=1, 2, ..., m), includes a switching element Q connected to the signal lines $G_i$ and $D_j$, and an LC capacitor Clc and a storage capacitor Cst that are connected to the switching element Q. The storage capacitor Cst may be omitted.

The switching element Q, one exemplary embodiment of which is a TFT, is disposed on the lower panel 100 and has three terminals, i.e., a control terminal, such as a gate electrode, connected to the image scanning line $G_i$, an input terminal, such as a source electrode, connected to the image data line $D_j$, and an output terminal, such as a drain electrode, connected to the LC capacitor Clc and the storage capacitor Cst. Exemplary embodiments of the TFT may be made of amorphous silicon or polycrystalline silicon.

The LC capacitor Clc includes a pixel electrode 191 disposed on the lower panel 100 and a common electrode 270 disposed on the upper panel 200 as two terminals. The LC layer 3 disposed between the two electrodes 191 and 270 functions as a dielectric of the LC capacitor Clc. The pixel electrode 191 is connected to the switching element Q, such as to the output terminal thereof, and the common electrode 270 is supplied with a common voltage Vcom and covers an entire surface, or a substantial portion of the upper panel 200. In an alternative exemplary embodiment, unlike in FIG. 2, the common electrode 270 may be provided on the lower panel 100, and at least one of the electrodes 191 and 270 may have a shape of a bar or a stripe.

The storage capacitor Cst is an auxiliary capacitor for the LC capacitor Clc. The storage capacitor Cst includes the pixel electrode 191 and a separate signal line, which is provided on the lower panel 100, overlaps the pixel electrode 191 via an insulator, and is supplied with a predetermined voltage such as the common voltage Vcom. Alternatively, the storage capacitor Cst includes the pixel electrode 191 and an adjacent image scanning line called a previous image scanning line, which overlaps the pixel electrode 191 via an insulator.

For color display, each pixel uniquely represents one color in a set of colors (i.e., spatial division) or each pixel sequentially represents the colors in turn (i.e., temporal division) such that a spatial or temporal sum of the colors is recognized as a desired color. An example of a set of colors may include primary colors, and may include red, green, and blue. FIG. 2 shows an example of the spatial division in which each pixel includes a color filter 230 representing one of the colors in an area of the upper panel 200 facing the pixel electrode 191. In an alternative exemplary embodiment, the color filter 230 is provided on or under the pixel electrode 191 on the lower panel 100.

FIG. 4 shows an example of the sensing units SU, and as shown in FIG. 4, each of the sensing units SU includes a variable capacitor Cv connected to a horizontal or vertical sense data line (hereinafter, a sense data line) denoted by reference indicia SL, and a reference capacitor Cp connected between the sense data line SL and the reference voltage line RL.

The reference capacitor Cp may be constructed by overlapping the sense data line SL and the reference voltage line RL of the TFT array panel 100 with an insulator (not shown) interposed therebetween.

The variable capacitor Cv uses the sense data line SL of the TFT array panel 100 and the common electrode 270 of the common electrode panel 200 as two terminals, and the LC layer 3 interposed between the two terminals serves as a dielectric material. The capacitance of the variable capacitor Cv varies with an external stimulus such as a user's touch applied to the LC panel assembly 300. An example of the external stimulus is pressure. When the pressure is applied on the common electrode panel 200, the spacers are compressed and deformed, so that a distance between the two terminals varies. As a result, the capacitance of the variable capacitor Cv varies. When the capacitance of the variable capacitor Cv varies, a node voltage Vn between the reference capacitor Cp and the variable capacitor Cv that highly depends on the capacitance of the variable capacitor Cv varies. The node voltage Vn as a sense data signal is transmitted through the sense data line SL. The contact occurrence can be determined based on the sensing data signal.

As shown in FIG. 5, all the reset signal input units INI have substantially the same structure, and each of the reset signal input units INI includes a reset transistor Qr.

The reset transistor Qr is a three terminal element such as a TFT. The reset transistor Qr has a control terminal, such as a gate electrode, connected to a reset control signal RST, an input terminal, such as a source electrode, connected to a reset voltage Vr, and an output terminal, such as a drain electrode, connected to a sense data line SL ($SX_1$ to $SX_M$ or $SY_1$ to $SY_N$ in FIG. 3).

In addition, all the sense signal output units SOUT have substantially the same structure. Each of the sense signal output units SOUT includes an output transistor Qs. The output transistor Qs is also a three terminal element such as a TFT. The output transistor Qs has a control terminal, such as a gate electrode, connected to the sense data line SL, an input terminal, such as a source electrode, connected to an input voltage Vs, and an output terminal, such as a drain electrode, connected to the output data line OL. The output transistor Qs is also disposed in an edge region of the LC panel assembly 300. The output transistor Qs generates an output signal based on the sense data signal that flows through the sense data line SL, and the output signal is output through the output data line OL. A current signal is an example of the output signal. Alternatively, the output transistor Qs may generate a voltage signal.

The reset transistor Qr and the output transistor Qs as TFTs are formed together with the switching element Q.

The output data lines $OY_1$-$OY_N$ and $OX_1$-$OX_M$ include a plurality of row and column output data lines $OY_1$-$OY_N$ and $OX_1$-$OX_M$ connected at one end to the row and column sense data lines $SY_1$-$SY_N$ and $SX_1$-$SX_M$ through the sense signal output units SOUT. The output data lines $OY_1$-$OY_N$ and $OX_1$-$OX_M$ are connected at an opposite end to the sense signal processor 800. The output data lines $OY_1$-$OY_N$ and $OX_1$-$OX_M$ transmit output signals of the sense signal output units SOUT to the sense signal processor 800. The row and column output data lines $OY_1$-$OY_N$ and $OX_1$-$OX_M$ are disposed to extend substantially in the column direction in parallel to each other in a portion that extends to the sense signal processor 800, however a first portion of some of the row output data lines $OY_1$-$OY_N$ may extend in the row direction from the sense signal output units SOUT prior to extending in the column direction.

Referring to FIGS. 1 and 3 again, the gray voltage generator 550 generates a full number of gray voltages or a limited number of gray voltages (referred to as "reference gray voltages" hereinafter) related to the transmittance of the pixels PX. Some of the (reference) gray voltages have a positive polarity relative to the common voltage Vcom, while the other of the (reference) gray voltages have a negative polarity relative to the common voltage Vcom.

The image scanning driver 400 is connected to the image scanning lines $G_1$-$G_n$ of the LC panel assembly 300, and synthesizes a gate-on voltage Von and a gate-off voltage Voff to generate the image scanning signals for application to the image scanning lines $G_1$-$G_n$.

The image data driver 500 is connected to the image data lines $D_1$-$D_m$ of the LC panel assembly 300 and applies image data voltages, which are selected from the gray voltages supplied from the gray voltage generator 550, to the image data lines $D_1$-$D_m$. However, when the gray voltage generator 550 generates only a few of the reference gray voltages rather than all the gray voltages, the image data driver 500 may divide the reference gray voltages to generate the image data voltages from among the reference gray voltages.

The sense signal processor 800 includes a plurality of amplifying units 810 connected to the output data lines $OY_1$-$OY_N$ and $OX_1$-$OX_M$ of the LC panel assembly 300.

As shown in FIG. 5, the plurality of amplifying units 810 have substantially the same structure. Each amplifying unit 810 includes an amplifier AP. The amplifier AP has an inversion terminal (−), a non-inversion terminal (+), and an output terminal. The inversion terminal (−) is connected to the output data line OL of a corresponding sense signal output unit SOUT, and the non-inversion terminal (+) is connected to a reference voltage Va. Each of the amplifying units 810 amplifies the output current from the output transistor Qs of the corresponding sense signal output unit SOUT using the amplifier AP, thereby generating a sense data signal Vo.

The sense signal processor 800 may then convert the analog sense data signals Vo from the amplifying units 810 to digital signals by using an analog-to-digital converter (not shown) to generate digital sense data signals DSN.

The contact determiner 700 receives the digital sense data signals DSN from the sense signal processor 800, and performs signal processing to determine whether a contact occurs and a contact position, and outputs contact information INF such as a contact position to the outside. The contact determiner 700 monitors operational states of the sensing units SU based on the digital sense data signals DSN so as to control signals applied to the sensing units SU.

The contact determiner 700 will be further described below.

The signal controller 600 controls the image scanning driver 400, the image data driver 500, the gray voltage generator 550, the sense signal processor 800, etc.

Each of driving devices 400, 500, 550, 600, 700, and 800 may include at least one integrated circuit ("IC") chip mounted on the LC panel assembly 300 or on a flexible printed circuit ("FPC") film in a tape carrier package ("TCP")

type, which are attached to the LC panel assembly 300. In alternative exemplary embodiments, at least one of the driving devices 400, 500, 550, 600, 700, and 800 may be integrated into the LC panel assembly 300 along with the signal lines $G_1$-$G_n$, $D_1$-$D_m$, $SY_1$-$SY_N$, $SX_1$-$SX_M$, $OY_1$-$OY_N$, $OX_1$-$OX_M$, and RL, and the switching elements Q. As a further alternative exemplary embodiment, all the driving devices 400, 500, 550, 600, 700, and 800 may be integrated into a single IC chip, but at least one of the driving devices 400, 500, 550, 600, 700, and 800 or at least one circuit element in at least one of the driving devices 400, 500, 550, 600, 700, and 800 may be disposed outside of the single IC chip.

Now, the display operation and the sensing operation of the above-described LCD will be described in detail.

The signal controller 600 is supplied with input image signals R, G, and B and input control signals for controlling the display thereof from an external graphics controller (not shown). The input control signals include a vertical synchronization signal Vsync, a horizontal synchronization signal Hsync, a main clock signal MCLK, and a data enable signal DE.

On the basis of the input control signals and the input image signals R, G, and B, the signal controller 600 generates gate control signals CONT1 and data control signals CONT2 and processes the image signals R, G, and B to be suitable for the operation of the LC panel assembly 300 and the data driver 500.

Responsive to the data control signals CONT2 from the signal controller 600, the data driver 500 receives a packet of the digital image signals DAT for the row of pixels PX from the signal controller 600, converts the digital image signals DAT into analog data voltages selected from the gray voltages from the gray voltage generator 550, and applies the analog data voltages to the data lines $D_1$-$D_m$.

The gate driver 400 applies the gate-on voltage Von to a gate line $G_1$-$G_n$ in response to the gate control signals CONT1 from the signal controller 600, thereby turning on the switching transistors Q connected thereto. The data voltages applied to the data lines $D_1$-$D_m$ are then supplied to the pixels PX through the activated switching transistors Q.

A difference between a data voltage and the common voltage Vcom applied to a pixel PX is represented as a voltage across the LC capacitor Clc of the pixel PX, which is referred to as a pixel voltage. The LC molecules within the LC layer 3 in the LC capacitor Clc have orientations depending on the magnitude of the pixel voltage, and the molecular orientations determine the polarization of light passing through the LC layer 3. The polarizer(s) converts light polarization to light transmittance such that the pixel PX has a luminance represented by a gray of the data voltage.

By repeating this procedure by a unit of a horizontal period (which is also referred to as "1H" and is equal to one period of the horizontal synchronization signal Hsync and the data enable signal DE), all gate lines $G_1$-$G_n$ are sequentially supplied with the gate-on voltage Von, thereby applying the data voltages to all pixels PX to display an image for a frame.

When the next frame starts after one frame finishes, the inversion signal RVS applied to the data driver 500 is controlled such that the polarity of the data voltages is reversed (which is referred to as "frame inversion"). The inversion signal RVS may also be controlled such that the polarity of the data voltages flowing in a data line are periodically reversed during one frame (for example row inversion and dot inversion), or the polarity of the data voltages in one packet are reversed (for example column inversion and dot inversion).

In the meantime, with reference to FIG. 5, the reset signal input unit INI applies a reset voltage Vr to the sense data line SL in accordance with a reset signal RST, to initialize the sense data line SL. Then, the sense signal processor 800 reads a sense data signal Vo amplified via amplifier AP from an output data line OL when the common voltage Vcom is a low level. The sense signal processor 800 amplifies the read sense data signal Vo and converts it to a digital sense data signal DSN, to output it to the contact determiner 700.

The sense signal processor 800 writes the sensing data signals applied through the output data lines $OY_1$ to $OY_N$ and $OX_1$ to $OX_M$ once for each of frames in a porch period between the frames according to the sensing data control signals CONT3 from the signal controller 600, as shown in FIG. 3. Particularly, it is preferable that the sense signal processor 800 performs a sensing operation in a front porch period ahead of the vertical synchronization signal Vsync. In the porch period, since the sensing data signal Vo is not strongly affected by the driving signals from the image scanning driver 400 and the image data driver 500, reliability of the sensing data signals Vo can be improved. The reading operation is not necessarily performed every frame, and it may be performed once for a plurality of frames. In addition, two or more reading operations may be performed in one porch period. Alternatively, at least one reading operation may be performed at one frame of the porch period.

Now, the reading operation of the sense data signal Vo will be described in detail with reference to FIG. 5.

After initializing the sense data line SL, when the reset signal RST has a turn-off voltage Voff, the sense data line SL comes to be in a floating state, and a voltage applied to the control terminal of the output transistor Qs changes based on a change in capacitance of the variable capacitor Cv and a variation in the common voltage Vcom according to the contact occurrence of the sensing units SU. Due to the change in voltage, the current of the sense data signal flowing through the output transistor Qs changes.

Then, the sense signal processor 800 reads the sense data signal Vo. The time in which the sense data signal Vo is read may be set to be less than the time of 1H after the reset signal RST becomes the turn-off voltage Voff.

Since the sense data signal Vo changes based on the reset voltage Vr, the sense data signal Vo always has a voltage level in a constant range. Therefore, the contact occurrence and the contact position can be easily determined.

In this manner, after the analog sense data signals Vo are read by using the amplifying units 810, the sense signal processor 800 converts the sense data signals Vo to the digital sense data signals DSN and transmits the digital sense data signals DSN to the contact determiner 700.

The contact determiner 700 suitably processes the received digital sense data signals DSN to determine the contact occurrence and the contact position, and transmits the results thereof to an external apparatus. The external apparatus transmits the image signals R, G, and B based on the results to the LCD to display the results on a screen or menu selected by a user.

The processing of the digital sense data signals DSN by the contact determiner 700 is described in detail with reference to FIGS. 6A to 9.

In FIGS. 6A to 8B, a vertical axis represents an analog voltage corresponding to a digital sense data signal DSN, and the analog voltage may have a unit of mV.

Figure 6A:
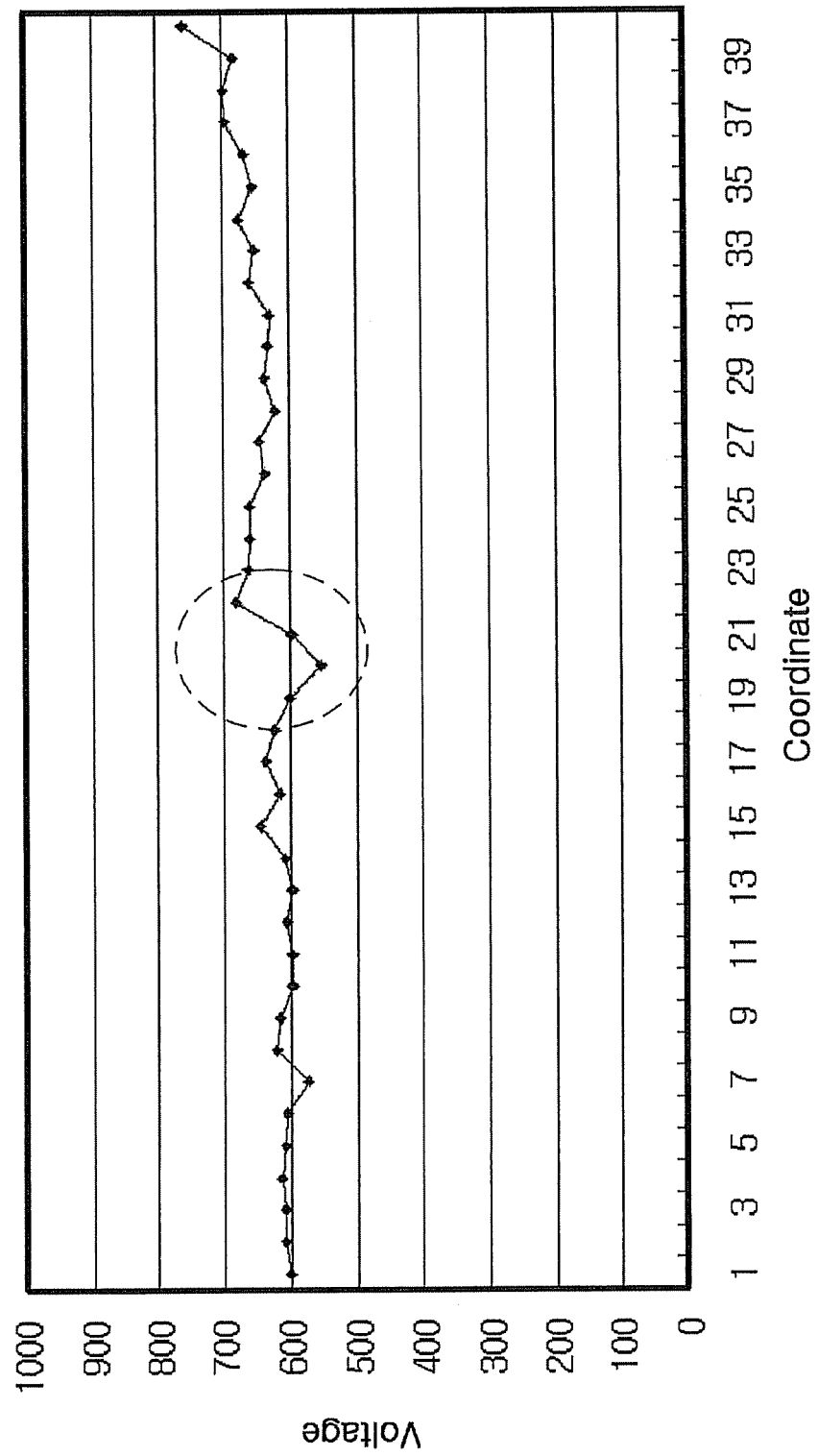
FIG. 6A shows digital sense data signals with respect to a predetermined frame.
Figure 6B:
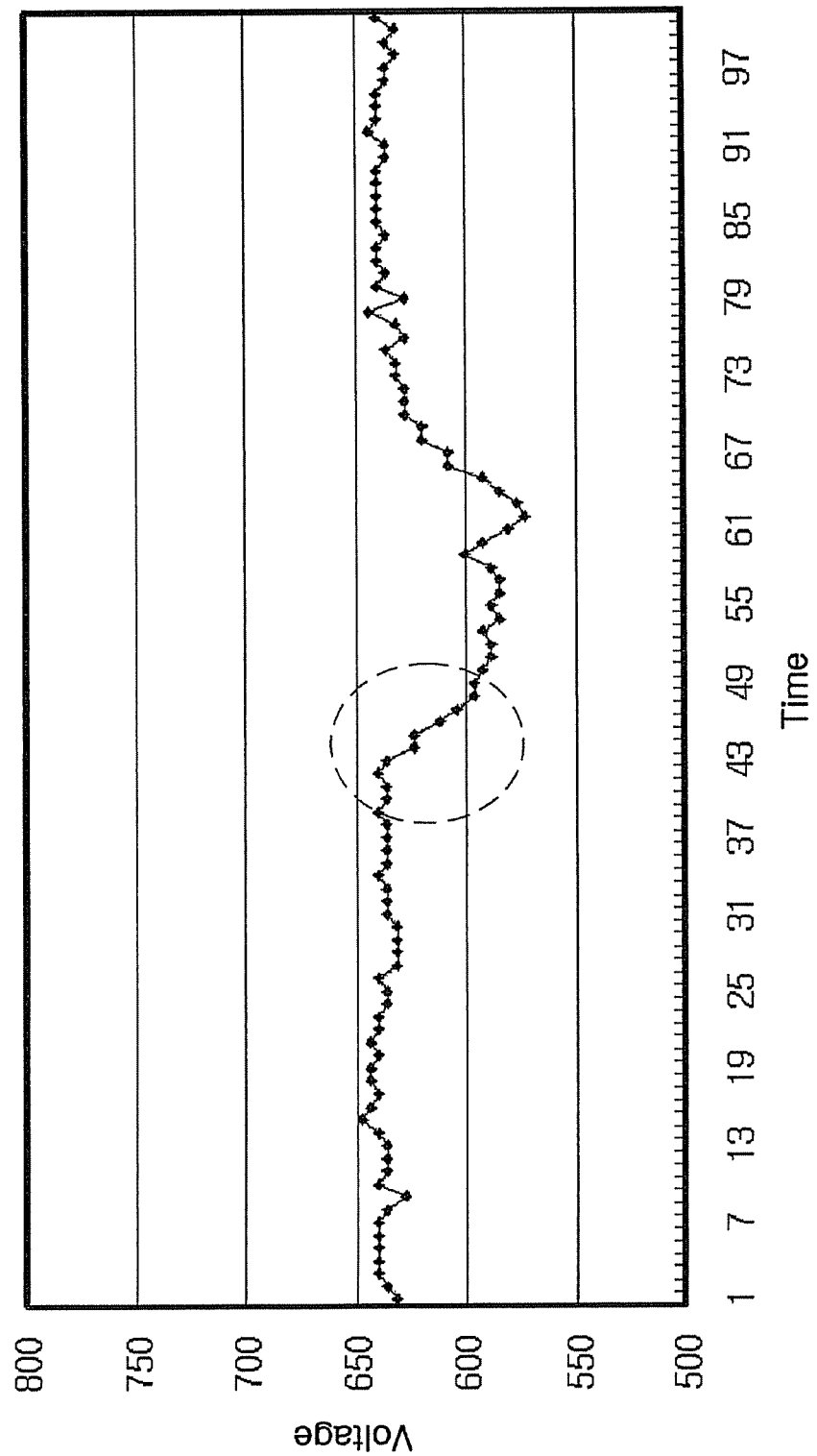
FIG. 6B shows digital sense data signals with respect to a plurality of frames classified according a predetermined row coordinate.
Figure 6C:
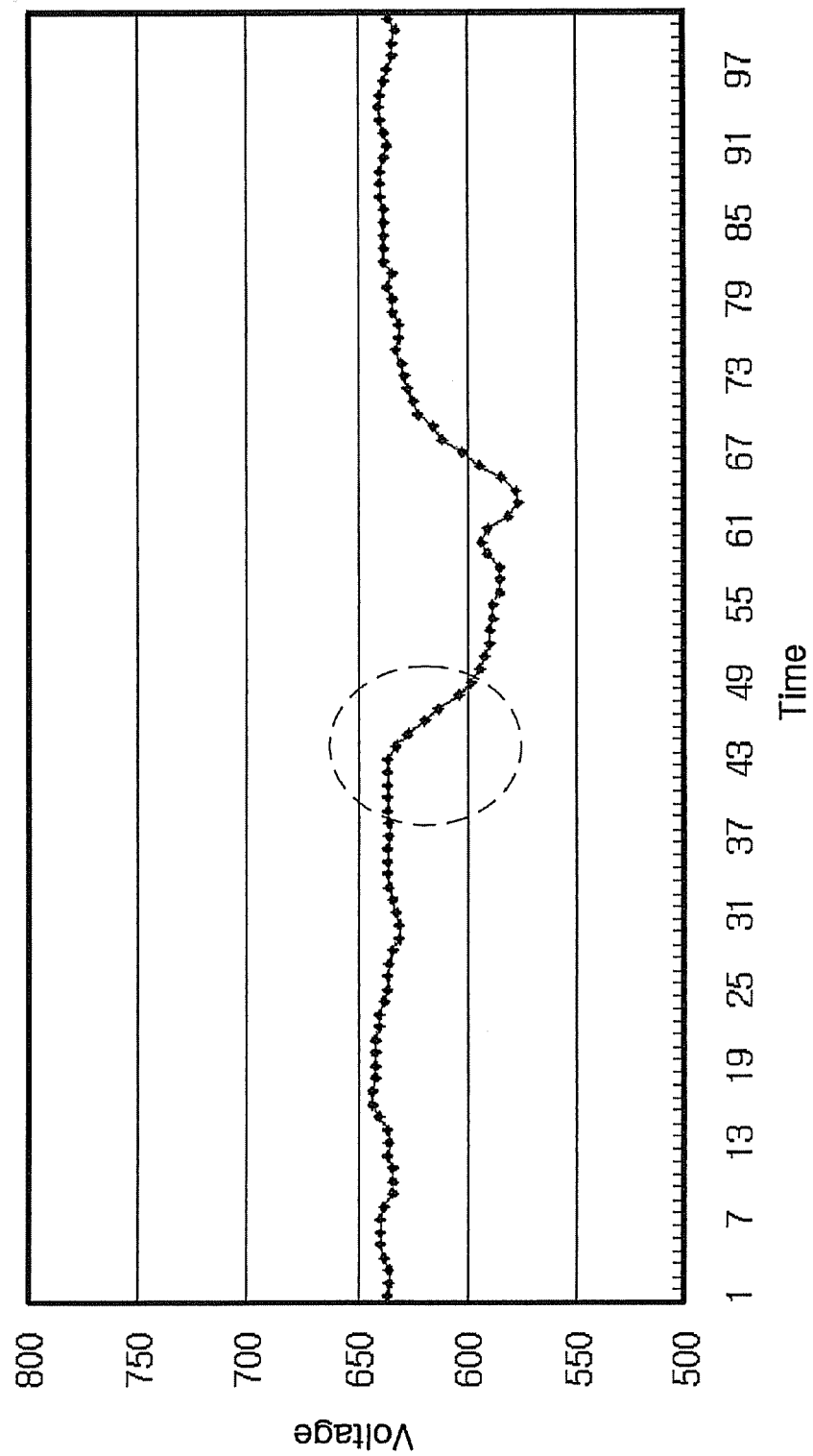
FIG. 6C shows the digital sense data signals shown in FIG. 6B as filtered.
Figure 6D:
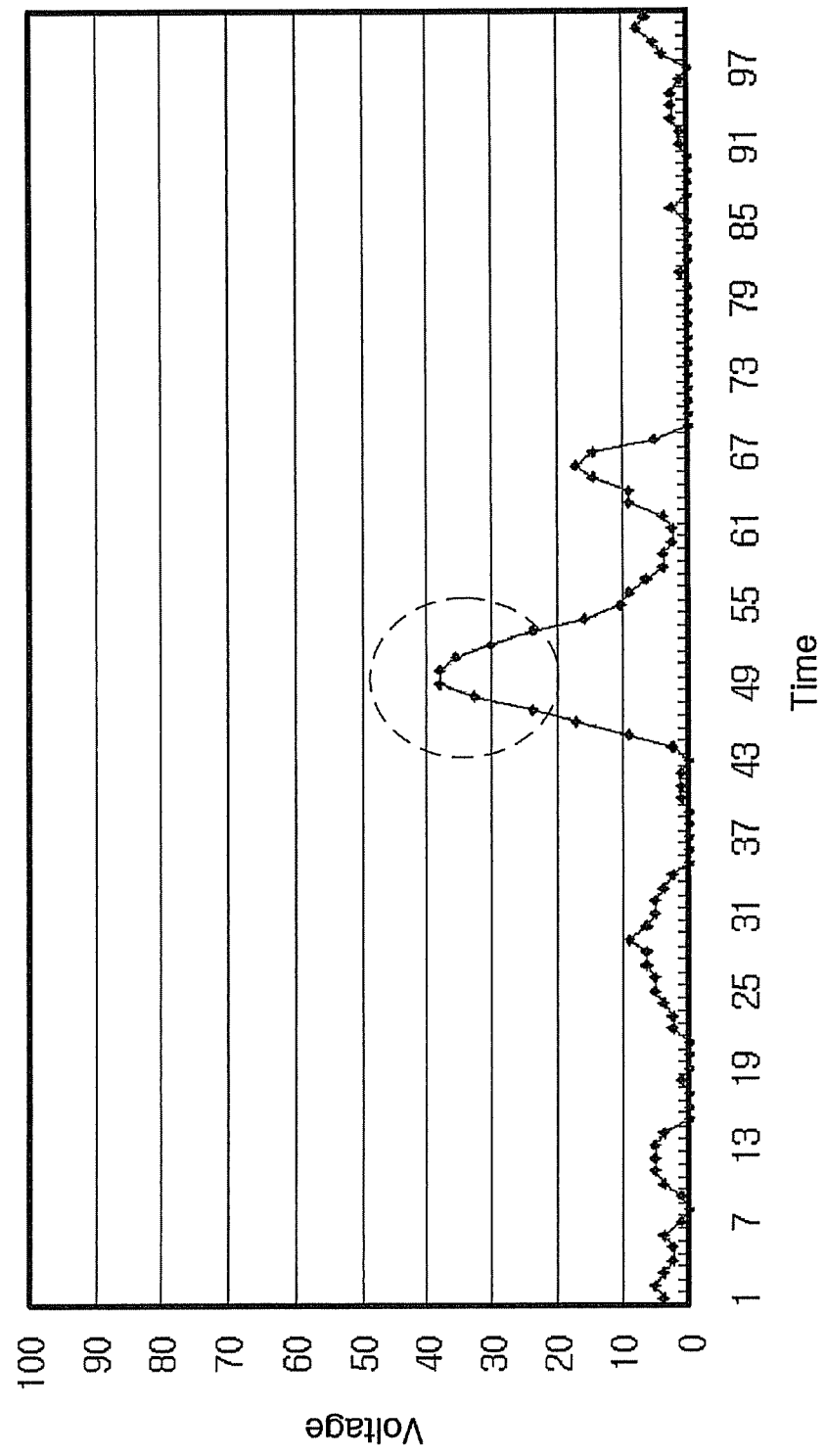
FIG. 6D shows first deviation data with respect to a predetermined row coordinate calculated based on the digital sense data signals in FIG. 6C.
Figure 7A:
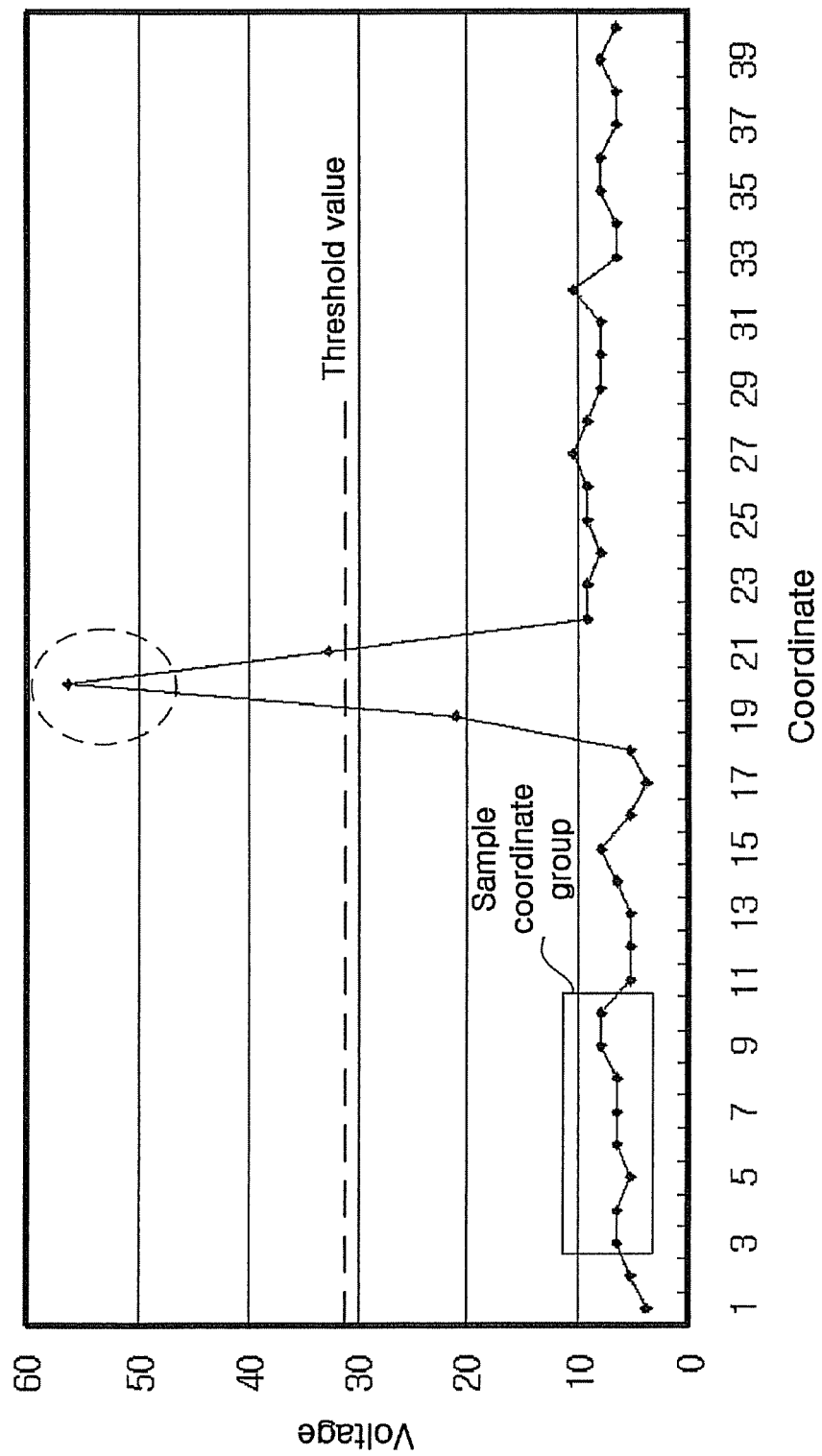
Figure 7B:
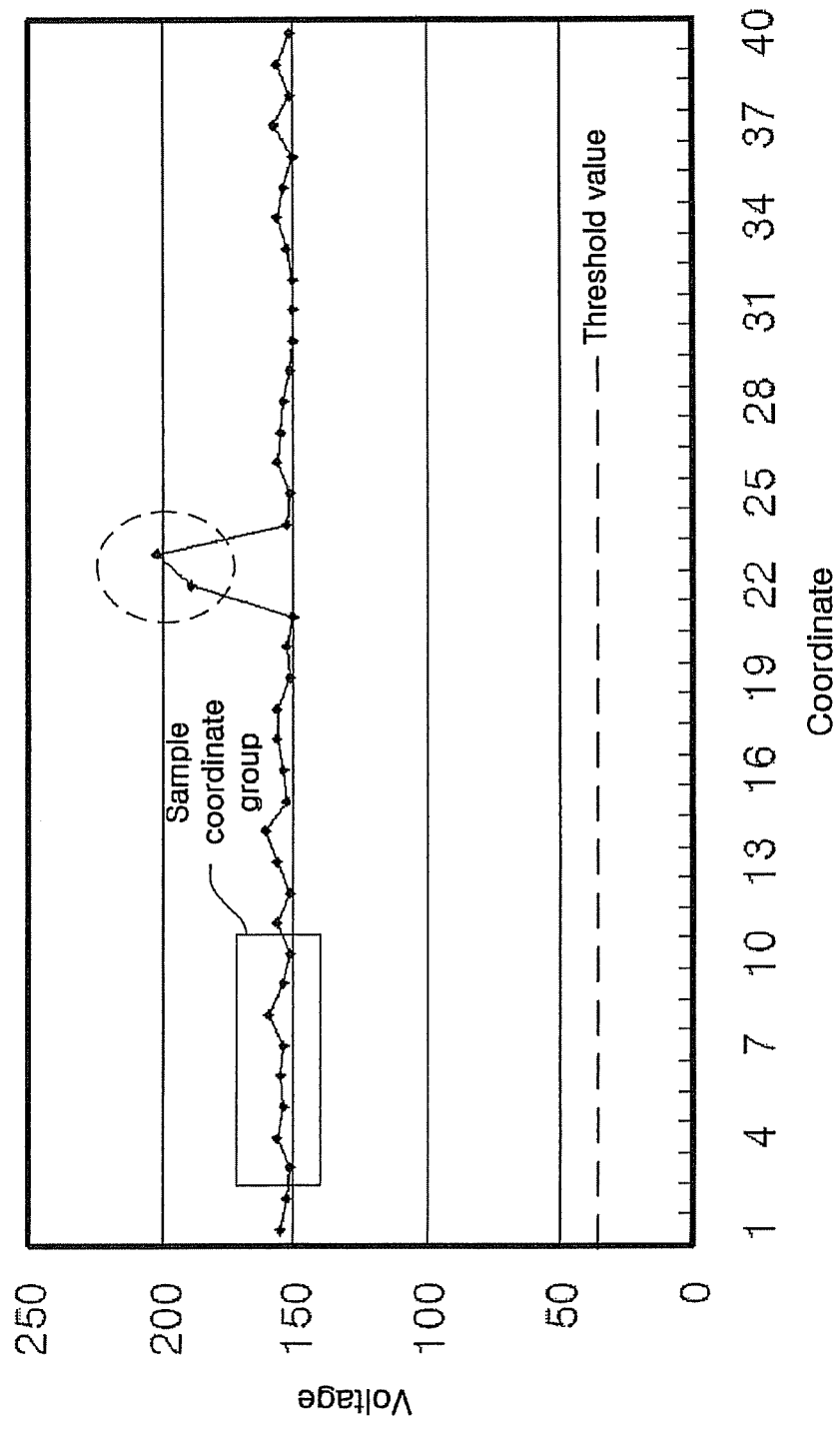
Figure 8A:
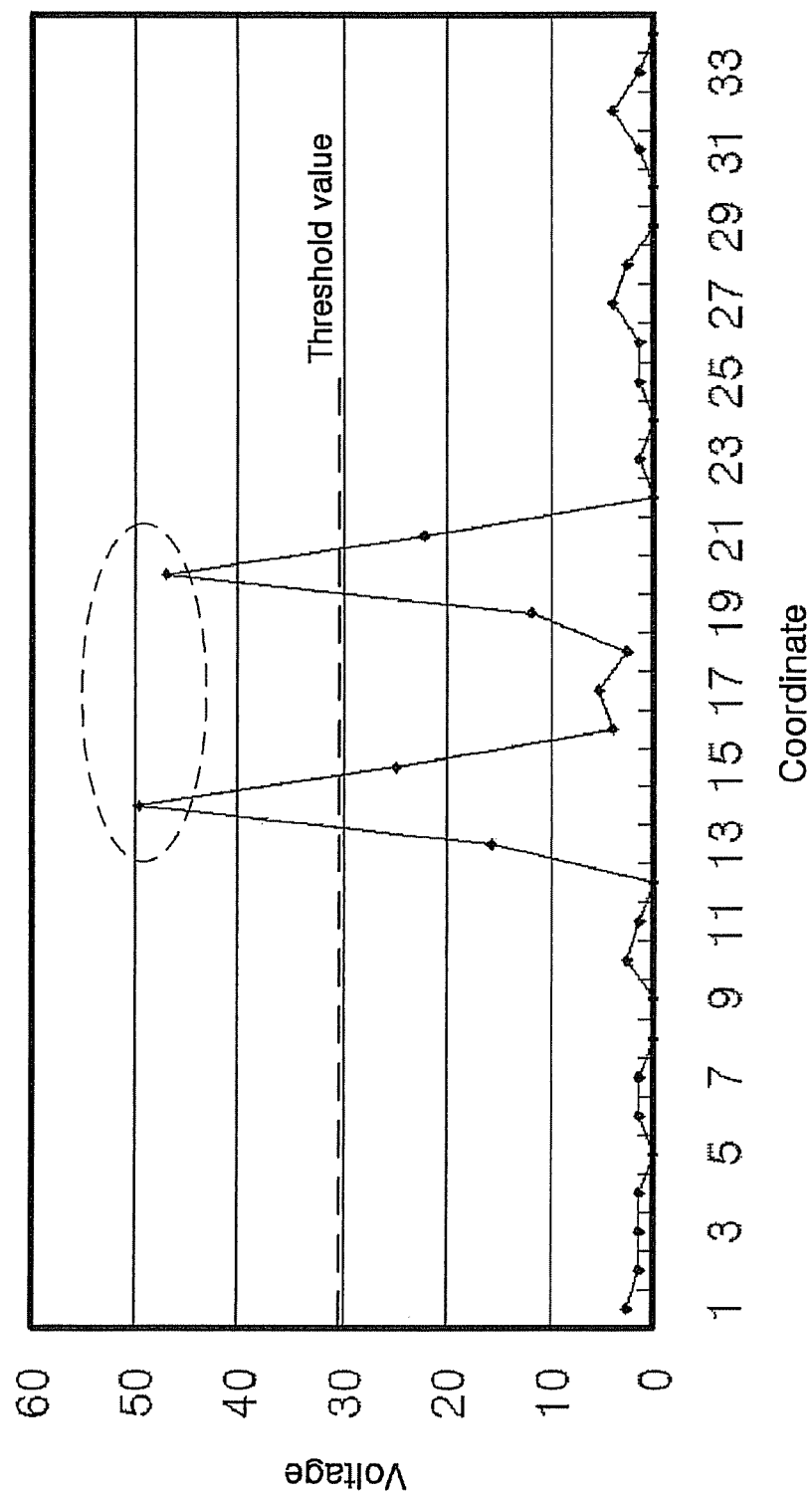
FIGS. 8A and 8B show second deviation data based on the first deviation data shown in FIGS. 7A and 7B, respectively.
Figure 8B:
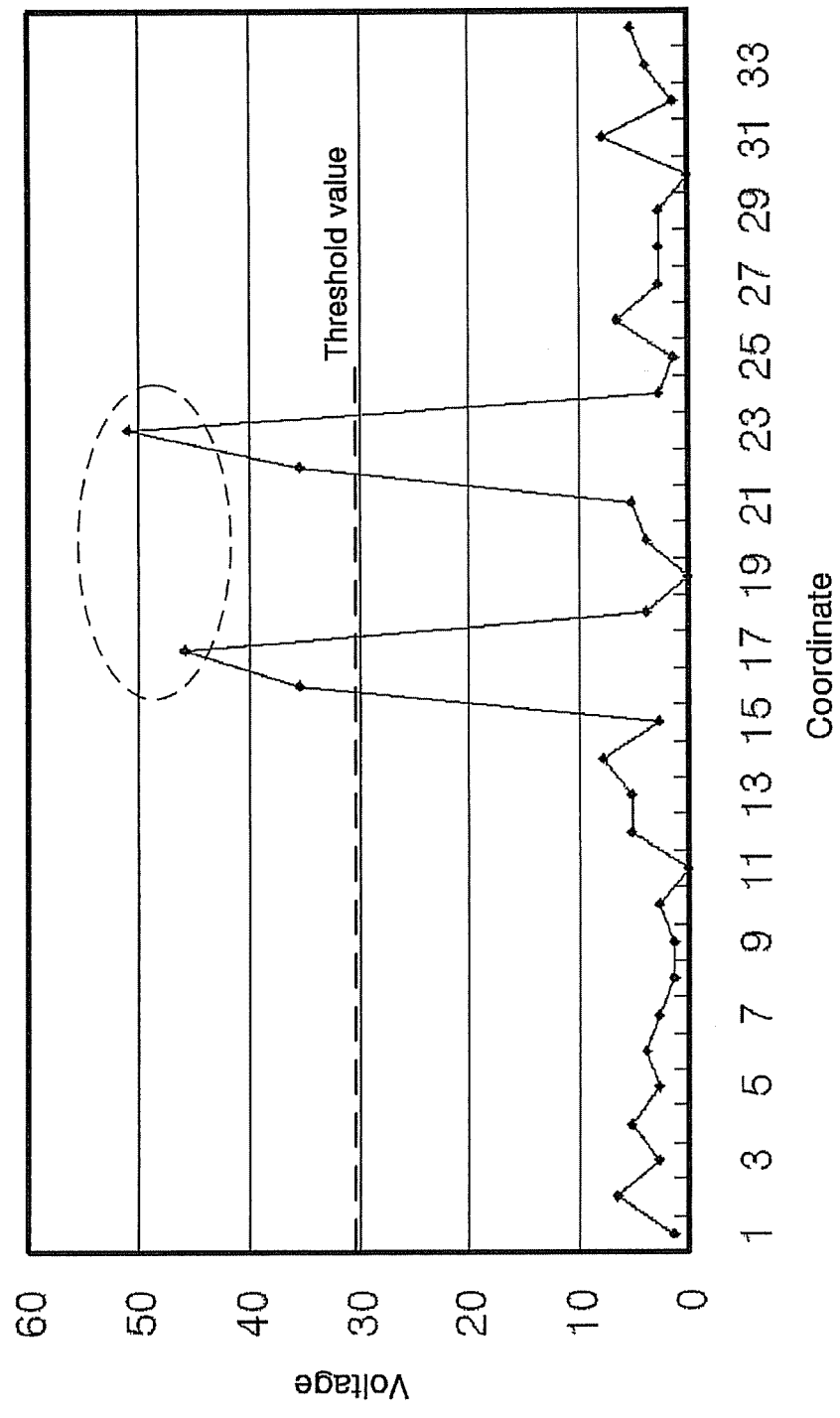

FIGS. 6A to 6C show signal waveforms of a digital sense data signal processed by the exemplary contact determiner, and FIG. 6D shows deviation data operated every frame based on the data shown in FIG. 6C. That is, FIG. 6A shows digital sense data signals with respect to a predetermined frame, FIG. 6B shows digital sense data signals with respect to a plurality of frames classified according a predetermined row coordinate, FIG. 6C shows the digital sense data signals shown in FIG. 6B as filtered, and FIG. 6D shows first deviation data with respect to a predetermined row coordinate that is calculated based on the digital sense data signals in FIG. 6C. FIGS. 7A and 7B show first deviation data classified according to a predetermined frame, respectively, and FIGS. 8A and 8B show second deviation data based on the first deviation data shown in FIGS. 7A and 7B, respectively.

The contact determiner 700 receives row and column digital sense data signals DSN with respect to a plurality of frames from the sense signal processor 800, respectively.

The contact determiner 700 classifies the digital sense data signals DSN with respect to each frame according to row and column units and stores the classified digital sense data signals DSN, such as in a frame unit.

The contact determiner 700 determines contact information of the row sense data signals DSN and contact information of the column sense data signals DSN, separately. At this time, the contact information of the row or column sense data signals DSN may determined in the same manner. Each row coordinate value is obtained based on each row sense data signal DSN, and each column coordinate value is obtained based on each column sense data signal DSN.

Next, the signal processing for obtaining one coordinate, for example a row coordinate on which a contact occurs, will be described.

As described above, the digital sense data signals DSN read in the plurality of frames may be stored in a frame unit. At this time, the digital sense data signals DSN of the corresponding frame is stored according to each of the row and column coordinates.

FIG. 6A shows digital sense data signals DSN read in one predetermined frame, and in FIG. 6A, each of the digital sense data signals DSN corresponds to one row coordinate. In FIG. 6A, the horizontal axis represents row coordinates obtained by the digital sense data signals DSN. In FIG. 6A, it may be predicted that a contact occurs in a sensing unit SU disposed on a portion denoted by a circle, that is, in a sensing unit SU disposed on a twenty-first row contact.

Then, the digital sense data signals DSN stored in a frame unit are classified according to each coordinate.

That is, since the digital sense data signals DSN read in the plurality of frames are classified in a coordinate unit, according to each coordinate, as shown in FIG. 6B, a variation of a digital sense data signal DSN of one row coordinate is shown according to a time variation, that is, a frame variation. A horizontal axis in FIG. 6B represents time, that is, frames each in which the digital sense data signal DSN is read. In FIG. 6B, it may be predicted that a contact occurs in a portion denoted by a circle, that is, in forty-fifth to forty-ninth frames.

Then, when ripple noises are detected in the digital sense data signal DSN classified as shown in FIG. 6B, the digital sense data signals DSN are filtered to deform into a gentle waveform, as shown in FIG. 6C.

At this time, the filtering operation is performed based on Equation 1.

$$Si = (1/Nn) \sum_{k=i}^{i+Nn-1} Rk$$ [Equation 1]

In the above Equation 1, S represents a digital sense data signal after filtering, R represents a digital sense data signal before filtering, i represents the number of the corresponding frame, and Nn represents the number of frames of a sample frame group.

As described above, a sample frame group with respect to each of the row coordinates is defined, and the sum of the digital sense data signals DSN of the sample frame group is divided by the number of frames to generate filtered digital sense data signals DSN of a row coordinate with respect to the corresponding frame. The filtering operation is performed on the digital sense data signals DSN (referring to FIG. 6B) of all the row coordinates. At this time, the sample frame group includes a plurality of sequential frames, for example X sequential frames next to the corresponding frame. The number of frames of the sample frame group may be defined experimentally, and may be varied. Referring to FIG. 6C, it may be predicted that a contact occurs in frames denoted by a circle, as in FIG. 6B.

The contact determiner 700 then generates first deviation data based on the filtered digital sense data signals DSN, where a filtered digital sense data signal DSN is represented by S. The first deviation data is obtained by Equation 2.

$$F_{i,j} = \text{Max}\{S_{i+k,j} - S_{i,j}, k=1, 2, \ldots, (Nn-1)\}$$ [Equation 2]

At this time, F represents the first deviation data, i represents the number of the corresponding frame, and j represents the number of the corresponding coordinate.

Differences between the filtered digital sense data signal DSN, such as $S_{i,j}$, of the corresponding frame and the digital sense data signals DSN, such as $S_{i+k,j}$, of a sample frame group are obtained, respectively, and the maximum value of the differences is defined as the first deviation data ($F_{i,j}$) of the corresponding frame in each row coordinate. At this time, the filtered digital sense data signal DSN of the corresponding frame, such as $S_{i,j}$, is subtracted from the respective digital sense data signals DSN of a sample frame group, such as $S_{i+k}$. The calculation operation of the first deviation data ($F_{i,j}$) is performed on the filtered digital sense data signals DSN of all the row coordinates.

At this time, the number of the sample frame group may be the same as that of the sample frame group for the filtering operation, but may be different. The number of the sample frame group may be varied as the sample frame group for the filtering operation.

An example of the first deviation data with respect to one row coordinate obtained by the above calculating operation is shown in FIG. 6D.

FIG. 6D shows the first deviation data ($F_{i,j}$) with respect to one coordinate in accordance with a time variation (a frame variation). In FIG. 6D, it may be predicted that a contact occurs in frames denoted by a circle, that is, near the forty-ninth frame. The horizontal axis in FIG. 6D represents time (frames).

The operation of the contact determiner 700 for calculating the first deviation data ($F_{i,j}$) based on the digital sense data signals DSN that are obtained in the plurality of frames is performed on all the column coordinates as well as all the row coordinates, and thereby the number of obtained graphs like the graph shown in FIG. 6D may be the same as those of all the row and column coordinates.

Then, the contact determiner 700 classifies the first deviation data (referring to FIG. 6D) that is calculated with respect to each of the row and column coordinates according to a frame. An example of the classified first deviation data is shown in FIGS. 7A and 7B. As shown in FIGS. 7A and 7B, the horizontal axis represents coordinates, for example row coordinates, respectively. As described above, the number of the coordinates is the same as that of the row sense data lines $SY_1$-$SY_N$.

FIG. 7A shows first deviation data with respect to a predetermined frame in which impulse noises do not occur in first deviation data, and FIG. 7B shows first deviation data with respect to a predetermined frame in which impulse noises occur in first deviation data.

Referring to FIG. 7A, a row coordinate of the first deviation data that has a value larger than a threshold value is about the twentieth row that is denoted by a circle, and thereby it is predicted that a contact occurs near the twentieth row.

Meanwhile, as described above with respect to FIG. 5, since an output signal, sense data signal Vo, is obtained by amplifying a sense data signal from a sense data line $SY_1$-$SY_N$ or $SX_1$-$SX_M$ using the transistor Qs and the amplifier 810, the output signal Vo is varied by a fine variation of the sense data signal.

Thus, when a voltage Vp, Vr, Vs, or Va is varied due to impulse noise from the outside, the sense data signal is varied such that the output signal Vo amplified based on the sense data signal is largely varied as well.

The first deviation data $(F_{i,\ j})$ is generated based on the sample frame group with respect to each coordinate. Thereby, in the frame in which the impulse noises occur, the first deviation data $(F_{i,j})$ of all the row coordinates has values that are larger than the threshold value as shown in FIG. 7B, and thereby a contact position is not determined.

For removing such a problem, the contact determiner 700 according to an exemplary embodiment generates second deviation data based on the first deviation data $(F_{i,j})$. The second deviation data is obtained by Equation 3.

$$FE_{i,j}=|F_{i,j}-F_{i,(j+Nf)}| \quad \text{[Equation 3]}$$

Here, FE represents the second deviation data, Nf represents the number of coordinates of a sample coordinate group, i represents the number of the corresponding frame, and j represents the number of the corresponding coordinate.

In row coordinates, the sample coordinate group includes coordinates of the predetermined number next to the corresponding coordinate, as in Equation 3. However, the sample coordinate group may include coordinates of the predetermined number previous from the corresponding coordinate.

Thus, the second deviation data $(FE_{i,j})$ of each coordinate represents a difference between the first deviation data $(F_{i,j})$ corresponding to the coordinate and the first deviation data $(F_{i,j+Nf})$ of the last coordinate of the sample coordinate group.

The contact determiner 700 generate the second deviation data $(FE_{i,j})$ with respect to all the frames, and regards the second deviation data $(FE_{i,j})$, that is, the maximum of the second deviation data $(FE_{i,j})$ that satisfies Equation 4 of all the second deviation data $(FE_{i,j})$ of the corresponding frame, as contact coordinates.

$$FEM=\text{Max}\{|F_{i,j}-F_{i,(j+Nf)}|,j=1,2,\ldots,N_L-(Nf-1)\} \quad \text{[Equation 4]}$$

In Equation 4, FEM represents the second deviation data $(FE_{i,j})$ of a contact coordinate, and NL represents the number of all the coordinates, that is, all the row coordinates in this embodiment.

However, the contact determiner 700 compares the maximum FEM of the second deviation data $(FE_{i,j})$ with a threshold value, and when the maximum FEM of the second deviation data $(FE_{i,j})$ is larger that the threshold value the contact determiner 700 determines that a contact occurs, and thereby a row coordinate of the maximum FEM of the second deviation data $(FE_{i,j})$ is a contact coordinate.

Referring to FIG. 8A, the second deviation data has two peaks with respect to the portion indicated by the circle in FIG. 7A. The two peaks are generated when a first deviation data is changed to a peak of the portion indicated by the circle in FIG. 7A, and when a first deviation data of the peak portion indicated by the circle in FIG. 7A descends, respectively. When the second deviation data $(FE_{i,j})$ of two peaks has values larger than the threshold value, a contact coordinate is defined based on a large one of the second deviation data $(FE_{i,j})$ of two peaks.

As described above, in the case that the contact coordinate (position) is determined using the second deviation data $(FE_{i,j})$, even though the values of the first deviation data $(F_{i,j})$ are larger than the threshold value due to the impulse noises as shown in FIG. 7B, two peaks larger than the threshold value are obtained as in FIG. 8B.

An example operation of the contact determiner 700 for determining the contact information using the second deviation data $(FE_{i,j})$ will be described.

Figure 9:
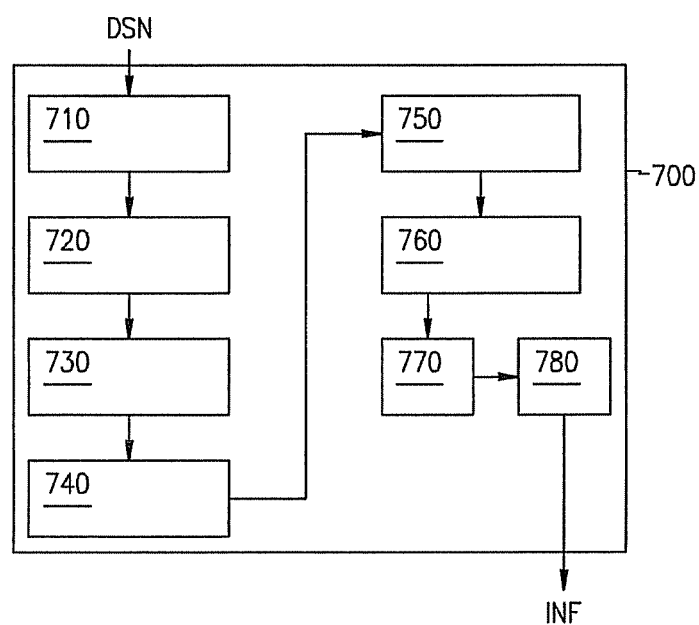
FIG. 9 is a block diagram of an exemplary contact determiner according to an exemplary embodiment of the present invention.

FIG. 9 is a block diagram of an exemplary contact determiner according to an exemplary embodiment of the present invention.

Referring to FIG. 9, the contact determiner 700 includes a receiving unit 710, a storing unit 720, a filtering unit 730, a first data generator 740, a second data generator 750, a reading unit 760, a register 770, and an interface 780.

The receiving unit 710 receives row and column digital sense data signals DSN of one frame from the sense signal processor 800, and outputs them to the storing unit 720.

The storing unit 720 may be a memory. The storing unit 720 has row and column coordinates of the sensing units SU as addresses, and stores the digital sense data signals DSN with respect to a plurality of frames in the corresponding address, respectively.

The filtering unit 730 filters each of the digital sense data signals DSN stored in storing unit 720 based on Equation 1. The filtering unit 730 may include a memory storing the filtered digital sense data signals DSN.

The first data generator 740 uses the filtered digital sense data signals DSN and operates Equation 2 to generate the first deviation data $(F_{i,j})$, and then the second data generator 750 uses the first deviation data $(F_{i,j})$ and operates Equation 3 to generate the second deviation data $(FE_{i,j})$.

The reading unit 760 may be a processor such as an advanced reduced instruction set computer ("RISC") machine ("ARM"). The reading unit 760 analyzes the second deviation data $(FE_{i,j})$ using a program and operates Equation 4 to generate the maximum of the second deviation data. The reading unit 760 compares the maximum with the threshold value to determine whether a contact occurs and a contact position.

The register 770 stores values of a flag that indicates a contact state, contact information such as the contact position, etc. The register 770 changes the values of the flag or stores changed contact information based on the determination of the reading unit 760.

The interface 780 may be a serial peripheral interface ("SPI"), etc. The interface 780 outputs the contact information INF stored in the register 770, control signals (not shown), etc., to the outside, and receives data or control signals from the outside.

In the exemplary embodiments, as one example of the sensing unit SU, the sensing unit SU is formed by a variable capacitor Cv and a reference capacitor Cp, but may be formed with different types thereof. For example, a pressure sensing unit using the common electrode 270 of the common electrode panel 200 and a sense data line SL of the TFT array panel 100 as two terminals of which at least one is designed to protrude and outputting the common voltage Vcom as an output signal when the two terminals are physically or electrically connected by a user's touch may be employed. In addition, an optical sensor that outputs different signals according to an intensity of light may be employed. In addition, the present invention may be applied to a display device including two or more types of sensing units.

In the aforementioned exemplary embodiments of the present invention, an LCD is exemplified as a display device, but it is not limited thereto. A plasma display panel ("PDP") device, an organic light emitting device ("OLED"), or other flat panel displays may be employed in the present invention.

According to exemplary embodiments of the present invention, the digital sense data signals are converted into signals having spatial and temporal deviation information, and thereby the contact information of the sensing units is easily determined even when impulse noises occur.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a display panel having a plurality of pixels;
   a plurality of sensing units formed in row and column directions in the display panel, each of the sensing units generating a first sense data signal based on a contact on the display panel;
   a sense signal processor generating second sense data signals based on the first sense data signals; and
   a contact determiner generating first deviation data based on the second sense data signal of a predetermined frame and the second sense data signals of a sample frame group, generating second deviation data based on the first deviation data of a predetermined sensing unit and the first deviation data of a sample sensing unit, and determining whether a contact occurs and a contact position based on the second deviation data, where the second deviation data of a coordinate represents a difference between the first deviation data corresponding to the coordinate and the first deviation data of a last coordinate of a sample coordinate group; and
   wherein the first deviation data includes a maximum of differences between the second sense data signal of the predetermined frame and the second sense data signals of the sample frame group.

2. The display device of claim 1, wherein the sample frame group comprises at least two frames next to the predetermined frame.

3. The display device of claim 1, wherein the sample sensing unit is spaced apart from the predetermined sensing unit.

4. The display device of claim 1, wherein the contact determiner filters the second sense data signals from the sense signal processor.

5. The display device of claim 4, wherein the contact determiner filters the second sense data signals using equation:

$$Si = (1/Nn) \sum_{k=i}^{i+Nn-1} Rk$$

wherein S represents a second sense data signal after filtering, R represents a second sense data signal before filtering, i represents a number of a corresponding frame, and Nn represents a number of frames of the sample frame group.

6. The display device of claim 1, wherein the contact determiner compares a maximum of the second deviation data of a frame and a reference value to determine whether the contact occurs and the contact position.

7. The display device of claim 1, wherein the sample sensing unit with respect to one sensing unit in the row direction is a remaining row sensing unit, and the sample sensing unit with respect to one sensing unit in the column direction is a remaining column sensing unit.

8. The display device of claim 1, wherein the contact determiner comprises:
   a filtering unit filtering the second sense data signals from the sense signal processor to remove noise;
   a first data generator generating the first deviation data based on filtered second sense data signals;
   a second data generator generating the second deviation data based on the first deviation data;
   a position determining unit determining whether the contact occurs and the contact position based on the second deviation data; and
   a register modifying a value of a contact flag and contact information based on determination result of the position determining unit.

9. The display device of claim 8, wherein the position determining unit generates a maximum of the second deviation data, and compares the maximum with a threshold value to determine whether a contact occurs and a contact position.

10. The display device of claim 1, wherein at least one of the plurality of sensing units comprises a variable capacitor having liquid crystal as a dielectric material and varying capacitance based on pressure, and a reference capacitor connected to the variable capacitor.

11. The display device of claim 1, wherein the first deviation data and the second deviation data include spatial and temporal deviation information.

12. The display device of claim 1, wherein, even when impulse noises occur in the display device, determining whether a contact occurs and determining a contact position is made possible by using the second deviation data.

13. A driving method of a display device, the display device having a plurality of pixels and a plurality of sensing units sensing a contact, the driving method comprising:
   generating sense data signals based on reading signals from the sensing units;
   generating first deviation data based on the sense data signal of a predetermined frame and the sense data signals of a sample frame group;
   generating second deviation data based on the first deviation data of a predetermined sensing unit and the first deviation data of a sample sensing unit; and
   determining whether a contact occurs and a contact position based on the second deviation data, where the second deviation data of a coordinate represents a difference between the first deviation data corresponding to the coordinate and the first deviation data of a last coordinate of a sample coordinate group; and
   wherein generating the first deviation data generates a maximum of differences between the sense data signal of the predetermined frame and the sense data signals of the sample frame group as the first deviation data.

14. The driving method of claim 13, further comprising filtering a noise after generating the sense data signals.

15. The driving method of claim 13, wherein determining whether the contact occurs and the contact position comprises comparing a maximum of the second deviation data of a frame and a reference value to determine contact occurrence and the contact position.

16. The driving method of claim 13, wherein generating sense data signals is based on a capacitance variation due to a contact.

\* \* \* \* \*